United States Patent
Bellandi

(10) Patent No.: US 10,286,562 B2
(45) Date of Patent: May 14, 2019

(54) ONE-FINGER ANGULAR PNEUMATIC GRIPPER AND RESPECTIVE MANUFACTURING METHOD

(71) Applicant: GIMATIC S.r.l., Roncadelle (BS) (IT)

(72) Inventor: Giuseppe Bellandi, Roncadelle (IT)

(73) Assignee: GIMATIC S.R.L., Roncadelle (BS) (IT)

( * ) Notice: Subject to any disclaimer, the term of this patent is extended or adjusted under 35 U.S.C. 154(b) by 0 days.

(21) Appl. No.: 15/714,766

(22) Filed: Sep. 25, 2017

(65) Prior Publication Data

US 2018/0085930 A1   Mar. 29, 2018

(30) Foreign Application Priority Data

Sep. 26, 2016   (IT) .................. 102016000096317

(51) Int. Cl.
   *B25J 15/02*   (2006.01)
   *B25J 15/12*   (2006.01)

(52) U.S. Cl.
   CPC ............. *B25J 15/12* (2013.01); *B25J 15/022* (2013.01)

(58) Field of Classification Search
   CPC ........ H01L 21/6838; B66C 1/02; B25J 15/12; B25J 15/022
   See application file for complete search history.

(56) References Cited

U.S. PATENT DOCUMENTS

| | | | | |
|---|---|---|---|---|
| 3,711,142 A | * | 1/1973 | Wolski | B66C 1/0212 294/183 |
| 4,671,553 A | | 6/1987 | Bertini | |
| 5,005,650 A | * | 4/1991 | Hopper | E21B 41/10 166/339 |
| 5,172,922 A | * | 12/1992 | Kowaleski | B25J 15/0616 279/3 |
| 8,181,948 B2 | * | 5/2012 | Blick | B23Q 1/032 269/20 |
| 2009/0127878 A1 | | 5/2009 | Maffeis et al. | |
| 2012/0169081 A1 | | 7/2012 | Takenaka et al. | |

FOREIGN PATENT DOCUMENTS

WO    9900223 A1    1/1999
WO    WO2008/100111 A1 *  8/2008

OTHER PUBLICATIONS

Gimatic S.r.l., "Grippers for clamping" pp. 218-229, Sep. 2016, http://www.gimatic.com/Gimatic/ProductsFiles/Catalogs/it/of.pdf.

* cited by examiner

*Primary Examiner* — Stephen A Vu
(74) *Attorney, Agent, or Firm* — Volpe and Koenig, P.C.

(57) ABSTRACT

A one-finger angular pneumatic gripper includes a body, in which a piston and a spring are accommodated, and a clamping finger hinged to the body. Differently from conventional solutions, the ends of the gripper body are not screwed or assembled ring nuts, but on the contrary they are integral parts of the body itself.

10 Claims, 2 Drawing Sheets

ONE-FINGER ANGULAR PNEUMATIC GRIPPER AND RESPECTIVE MANUFACTURING METHOD

TECHNICAL FIELD

The present invention relates to a one-finger angular pneumatic gripper and the respective manufacturing method.

BACKGROUND

In the field of industrial automation the use of one-finger pneumatic grippers is known, such as those shown in the Applicants' 2015 catalog accessible via the Internet at the following page: http://www.gimatic.com/Gimatic/Products-Files/Catalogs/it/of.pdf.

These are so called angular grippers since the only jaw they are provided with, hereinafter termed "clamping finger", is rotatable between a vertical open position aligned to the gripper body itself, and a horizontal closed position angled or transversal with respect to the gripper body. In practice, in the closed position the clamping finger cantileverly protrudes from the gripper body.

The finger movement is imparted by a pneumatic piston that moves in the gripper body, thus acting as a cylinder, in response to the force applied by, usually filtered, compressed air, that can be lubricated or not. The finger is hinged to the gripper body and is constrained to the piston by means of a sliding pin rotating in a slot of the piston itself.

Usually the one-finger grippers are used in the manufacturing industry in order to temporarily restrain workpieces or during the respective packaging thereof. To this effect they are also named "clamping" grippers.

The one-finger grippers presently available on the market all have more or less the same structure and are assembled as it will be now described.

The gripper body, also acting as cylinder, is a circular tube made of metal—usually aluminum—with open and threaded ends. During the assembling, a first end of the body is closed by screwing a first ring nut provided thereto with a gasket; the first ring nut has a hole for the compressed air passage and is indeed connectable to a supply line. The piston, provided with the respective circumferential gasket to ensure the leak tightness, and a spring functioning for bringing the piston back to its initial position when the compressed air supply is halted, are both inserted into the body. At the second end of the gripper body a second ring nut provided with gasket is then screwed. The second ring nut provides the spring with a stationary abutment surface, in order to allow the spring to be compressed under the action of the piston. The second ring nut has a through hole in which a part of the piston, which will be hereinafter named piston foot, is slidingly accommodated. The clamping finger is hinged to the second ring nut; the hinge axis is skew with respect to the axis of the gripper body and, thus, also to the piston axis. The clamping finger is also constrained to the piston foot by means of a pin parallel to the just described hinge and inserted in a slot obtained in the piston foot.

The functioning is simple. Considering the case in which the gripper is initially in the open position, that is to say with the clamping finger vertical, the compressed air supplied through the first ring nut causes the piston to draw back towards the second ring nut. In this phase, the spring is compressed against the second ring nut and the piston foot biases the clamping finger to rotate until bringing it to the closed position, where it remains for as long as compressed air is supplied to the gripper. At the moment the supplying is halted and the pressure inside the gripper decreases due to the compressed air vent, the spring brings the piston back in the open position.

Presently available gripers have certain limitations.

Firstly, the assembling times are long, due to the ring nuts having to be equipped with the respective gaskets centered with respect to the corresponding ends of the tubular body of the gripper and thus screwed while care being taken of complying with a specific tightening torque.

Secondly, often the ring nuts are the gripper weakness. Grippers have to stand millions of operating cycles; sometimes breaking occur at the ring nuts, for example the thread that keeps them constrained on the gripper body breaks, and the pneumatic tightness is therefore lost.

Last but not least, considering that the grippers are made in different sizes in order to offer a variety of powers, it is required for the manufacturer to provide a number of storehouse ring nuts adequate to allow all the new grippers to be assembled and the used grippers to be repaired.

SUMMARY

Object of the present invention is to provide an improved one-finger gripper, i.e. free from the aforesaid limitations.

Another object of the present invention is to provide a method for manufacturing the improved one-finger gripper.

In a first aspect the present invention therefore relates to a one-finger angular pneumatic gripper according to claim 1.

Specifically the gripper comprises a body, in which a piston and a spring are accommodated, and a clamping finger hinged to the body. The body is tubular and has a first end connectable to an external supply line of compressed air, and a second end at which the clamping finger is hinged.

The piston is alternately movable in the body in response to the force applied in a direction by the compressed air and by the spring, which acts as a return spring, in the opposite direction.

The clamping finger is biased to rotate by the piston between an open position longitudinal to the body, and a closed position transversal or angled with respect to the body.

Advantageously, differently from conventional solutions, the first and the second ends are not ring nuts screwed to the gripper body, but on the contrary, they are integral parts of the body.

This solution allows overcoming the limitations of the presently available grippers and allows maximizing the performances in terms of torsional and flexural rigidity, endurance and reliability.

Preferably, the body is obtained by tool machining a bar or tube, for example with a lathe and/or milling machine, the two ends being made directly from the solid.

Preferably, the first end is shaped as a connector for air-compressed lines, and has an inlet hole for compressed air towards the inside of the body. It is advisable to position a flow reducer in the hole.

Preferably, the second end is tool machined in order to obtain what is required to hinge a clamping finger to the gripper body. In particular in the second end, the seat is obtained of a pin acting as hinge of the clamping finger.

In the preferred embodiment, the gripper comprises a plug that can be inserted in the second end in order to constrain the piston and the spring within the body. Preferably, the plug can be snap fitted in the second end and is provided with a through opening from which a piston portion constrained to the clamping finger extends through; this way the piston transmits the movements to the clamping finger.

In a second aspect the present invention relates to a method, according to claim 11, for manufacturing the aforesaid one-finger gripper.

The method does not provide the ends of the gripper body being closed either by ring nuts or other assembled components. The ends of the gripper body are integral parts of the body itself, with the aforesaid advantages.

BRIEF DESCRIPTION OF THE DRAWINGS

Further characteristics and advantages of the invention will be more evident by the review of the following specification of a preferred, but not exclusive, embodiment depicted for illustration purposes only and without limitation, with the aid of the accompanying drawings, wherein.

DETAILED DESCRIPTION OF THE PREFERRED EMBODIMENTS

Figure 1:
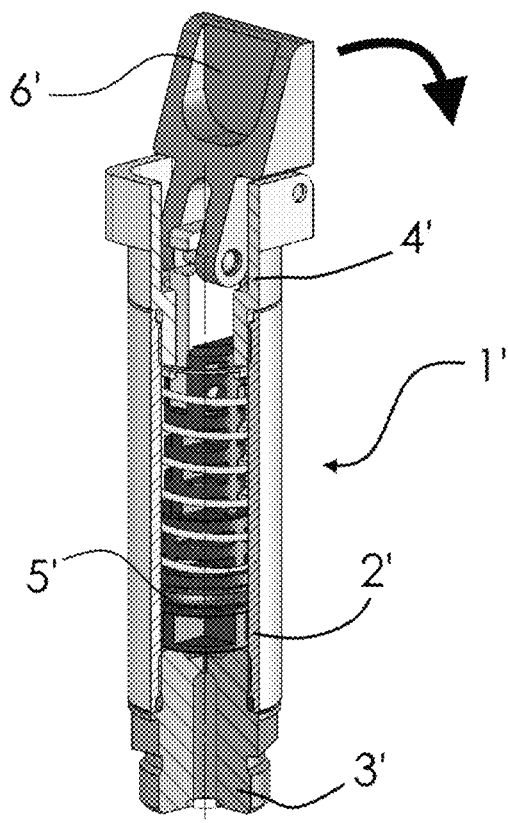
FIG. 1 is a perspective and partially cutaway view of a one-finger pneumatic gripper according to known art.

FIG. 1 shows a one-finger pneumatic gripper 1' according to the known art. As mentioned above, the gripper 1' comprises a body 2' that is substantially an aluminium tube 2' with threaded ends. Such ends are closed by corresponding plastic ring nuts 3' and 4' screwed to the body 2' of the gripper. Through the first ring nut 3', the lower one in FIG. 1, the duct extends that allows compressed air to be fed into the body 2'. A piston 5' is slidingly inserted into the body 2' so as to define a cylinder-piston type coupling. A single clamping finger 6' is hinged to the second ring nut 4', the upper one in FIG. 1, and is constrained to the piston that, in this way, drives the rotation thereof between the open position shown in FIG. 1 and the closed position, not shown, according to the direction shown by the arrow.

Figure 2:
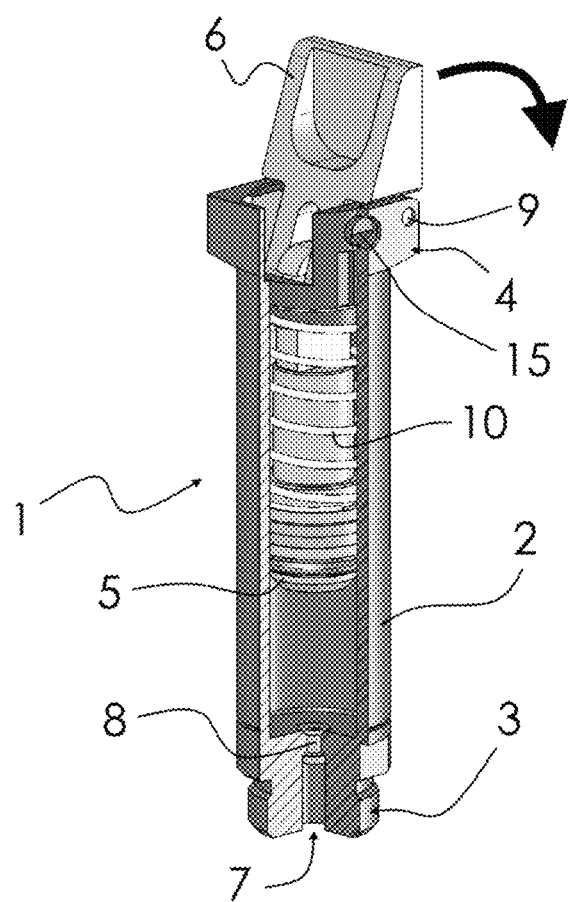
FIG. 2 is a perspective and partially cutaway view of a one-finger pneumatic gripper according to the present invention.

FIG. 2 shows an embodiment of the gripper 1 according to the present invention. Differently from solutions according to prior art, the gripper 1 does not provide the two lower and upper ring nuts 3' and 4'. The body 2 is a single piece obtained without assembling other components.

More in detail, the body 2 is obtained starting from a bar that is subjected to machining, such as for example lathing, in order to shape and obtain the lower part 3 and the upper part 4.

The lower part 3 is externally configured as a connection that allows the coupling to an external air-compressed supply line and internally provides the air supplying channel 7, in which a reducer 8 is positioned.

The upper part 4 is shaped to partially accommodate the clamping finger 6. The clamping finger 6 is rotatable with respect to the upper portion 4 on a pin 9 inserted into the same portion 4, such to be skew with respect to the axis of the piston 5 that moves in the body 2.

Having the lower 3 and upper 4 portions integral, i.e. made in a single piece with the body 2, the limitations of conventional solutions are overcome.

First of all, there is no risk of incurring in the breaking of nut rings or related threads. Furthermore, the gripper 1 in its entirety is stiffer than the gripper 1' according to the known art and can stand higher compressed-air pressures, the bulks being the same. Therefore a longer lifetime results.

As it will be now explained with reference to FIG. 3, the gripper 1 is easier to build than the grippers 1' according to known art.

Figure 3:
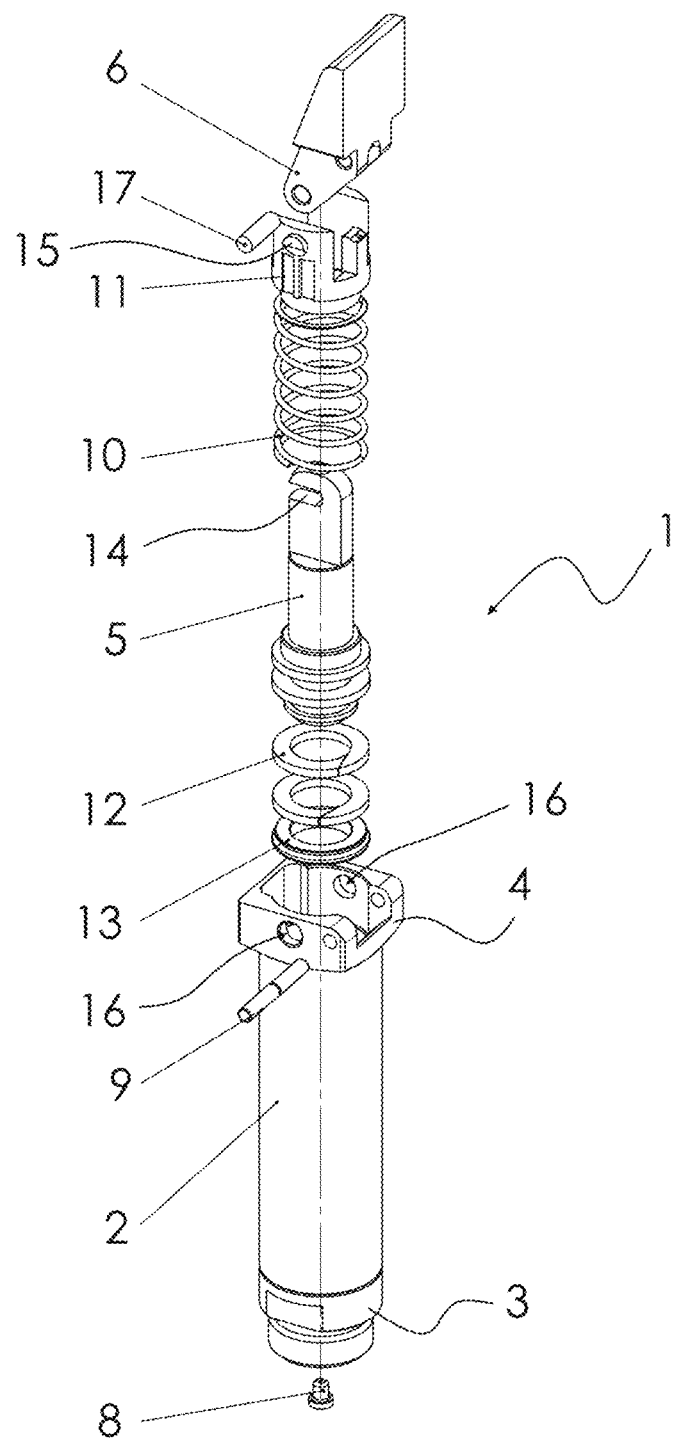
FIG. 3 is an exploded view of the one-finger gripper shown in FIG. 2.

With reference to FIG. 3, that shows an exploded view of the one-finger gripper 1, the assembling simply provides for inserting most of the components inside the body 2 of the gripper 1.

An optional magnet, functioning for actuating optional external magnetic sensors (that can be fastened to the gripper body by ties) is denoted by 12, and a gasket fitted on the head of the piston 5 before the respective insertion in the body 2, is denoted by 13.

Once the piston 5 has been inserted in the body 2, the insertion of the spring 10 is also carried out. The upper end of the body 2 is partially closed by a plug 11 provided with the projections 15 intended to be snap-fitted in corresponding holes 16 obtained in the upper portion 4 of the body 2 of the gripper 1. The plug 11 prevents the piston 5 and the spring 10 from coming out of the body 2 and, at the same time, constitutes the upper abutment of the spring 10, thus allowing the compression thereof.

The foot of the piston 5 has an elongated seat, or slot, 14 intended for receiving the pin 9. Once the plug 11 has been constrained on the body 2 of the gripper 1, the constraining of the clamping finger 6 is carried out by using the two pins 9 and 17. The pin 9 defines the hinge with the upper portion 4 and the pin 17 is used to constrain the clamping finger 6 to the slot 14 of the foot of the piston 5.

This way the assembling is completed rapidly and without the use of particular tools and ring nuts.

The invention claimed is:

1. A one-finger angular pneumatic gripper, comprising a body, a piston and a spring both housed in said body, and one clamping finger hinged to the body,
    wherein the body is tubular and has a first end connectable to an external supply line of compressed air, and a second end at which the clamping finger is hinged,
    and wherein the piston is alternately movable in the body in response to the force applied in a direction by the compressed air and by the spring in the opposite direction,
    and wherein the clamping finger is biased to rotate by the piston between an open position longitudinal to the body, and a closed position, transversal to the body,
    and wherein the first and the second ends are integral with the rest of the body, the gripper further comprising a plug inserted in the second end in order to constrain the piston and the spring in the body, wherein the plug is provided with a through opening, a piston portion extending through said through opening and the clamping finger being constrained to said piston portion.

2. The gripper according to claim 1, wherein the body is obtained by tool machining a bar or a tube, the two ends being made directly from solids.

3. The gripper according to claim 1, wherein the body is made of aluminum.

4. The gripper according to claim 1, wherein the first end is shaped as a connector for compressed air lines, and has an inlet hole for compressed air towards the inside of the body.

5. The gripper according to claim 4, wherein a flow reducer is positioned in the inlet hole.

6. The gripper according to claim 1, wherein the second end comprises an accommodating seat for a pin, tangential with respect to a circumference of the body and skew with respect to the motion axis of the piston, wherein the clamping finger is constrained to said pin.

7. The gripper according to claim 1, wherein the clamping finger is constrained to the piston by means of a pin sliding in a slot of the piston.

8. The gripper according to claim 1, wherein the plug can be snap fitted in the second end of the gripper.

9. The gripper according to claim 8, wherein the second end is provided with holes or niches, in which corresponding projections snap fit and cantileverly extend from a surface of the plug.

10. A method for manufacturing a one-finger angular pneumatic gripper according to claim 1, comprising the steps of:
   a) making the body of the gripper as a tube length having a first end and a second end,
   b) tool-machining the first end such that the first end is shaped to act as a connector for air-compressed lines, and the second end to obtain, from a solid, a seat of a pin in order to hinge a clamping finger to the body of the gripper;
   c) inserting a piston and a spring into the body, through the second end;
   d) blocking the second end by a plug so that only a part of the piston is exposed and slides with respect to the plug;
   e) hinging a clamping finger to the body by means of the pin, and
   f) constraining the piston to the clamping finger at the portion coming out of the plug.

\* \* \* \* \*